(12) United States Patent
Huang

(10) Patent No.: US 9,193,041 B2
(45) Date of Patent: Nov. 24, 2015

(54) VISE CAPABLE OF LINEAR AND ROTATIONAL MOVEMENT

(71) Applicant: VERTEX MACHINERY WORKS CO., LTD., Taichung (TW)

(72) Inventor: Han-Nung Huang, Taichung (TW)

(73) Assignee: Vertex Machinery Works Co., Ltd., Taichung (TW)

( * ) Notice: Subject to any disclaimer, the term of this patent is extended or adjusted under 35 U.S.C. 154(b) by 169 days.

(21) Appl. No.: 14/090,128

(22) Filed: Nov. 26, 2013

(65) Prior Publication Data

US 2015/0123334 A1 May 7, 2015

(30) Foreign Application Priority Data

Nov. 6, 2013 (TW) .............................. 102220671 U

(51) Int. Cl.
*B25B 1/04* (2006.01)
*B25B 1/24* (2006.01)
*B25B 1/02* (2006.01)
*B23Q 1/48* (2006.01)
*B23Q 3/06* (2006.01)
*B25B 1/10* (2006.01)

(52) U.S. Cl.
CPC ............ *B25B 1/2494* (2013.01); *B23Q 1/4804* (2013.01); *B23Q 3/066* (2013.01); *B25B 1/02* (2013.01); *B25B 1/103* (2013.01); *B25B 1/24* (2013.01)

(58) Field of Classification Search
CPC ........ B25B 1/2494; B25B 1/24; B25B 1/103; B25B 1/02; B25B 1/2421; B25B 1/2426; B25B 1/2431; B23Q 3/066; B23Q 1/4804; A01K 97/28
USPC .............. 269/43, 45, 55, 156, 246, 71, 75, 81
See application file for complete search history.

(56) References Cited

U.S. PATENT DOCUMENTS 2,353,891 A * 7/1944 Gruntorad ........................ 269/71
4,411,415 A * 10/1983 Denaro .......................... 269/134
4,953,839 A * 9/1990 Chern .............................. 269/73

* cited by examiner

*Primary Examiner* — Lee D Wilson
*Assistant Examiner* — Nirvana Deonauth
(74) *Attorney, Agent, or Firm* — Rosenberg, Klein & Lee

(57) ABSTRACT

A multiple-function clamping device includes a rotary base having an annular groove in the top thereof and scale marks are marked along in inclined surface of the rotary base. A positioning unit includes a first positioning member and a second positioning member. The positioning unit is located in the annular groove to form a linear slot. The first positioning member has a first alignment line and multiple linear marks. A vise has two side slots defined in two sides thereof so as to form an engaging portion which is engaged with the linear slot between the first and second positioning members. The vise further has a second alignment line located corresponding to the linear scale marks of the first positioning member. The vise can be moved linearly or rotatably so as to meet different requirements when machining an object.

5 Claims, 7 Drawing Sheets

SECTION:A—A

US 9,193,041 B2

VISE CAPABLE OF LINEAR AND ROTATIONAL MOVEMENT

BACKGROUND OF THE INVENTION

1. Fields of the Invention

The present invention relates to a clamping device, and more particularly, to a vise capable of linear and rotational movement so as to meet different requirements when machining objects.

2. Descriptions of Related Art

The conventional clamping device is to position metal objects to be cut, drilled and milled on a machine. Taiwan Utility Model M461503 discloses a vise which is connected to a base and automatically centered. The vise is stationary or movable linearly relative to the base, however, the users cannot be acknowledged the distance that the vise is moved. Therefore, the users have to measure the distance by using a ruler and this takes time. Besides, the vise cannot be rotated 360 degrees to machine the object from different angles.

As shown in FIG. 7 which shows another Taiwan Utility Model M380194 and comprises a vise 91 which is connected to an annular groove 931 in a rotary base 93 by two bolts 92 so that the vise 91 is rotated 360 degrees in the annular groove 931. The two respective heads 920 of the two bolts 92 is installed from the top of the annular groove 931, the length w2 of the short side of the head 920 is smaller than the width w3 of the annular groove 931, and the bolt 92 is rotated 90 degrees to be connected with a nut 921, wherein the length w1 of the long side of the head 920 is larger than the width w3 of the annular groove 931. The bolts 92 are easily off from the annular groove 931 when the base 93 is rotated, such that the vise 91 is loosened and cannot position the object to be machined. Besides, the base 93 does not have scale marks so that the user cannot know the degrees that the vise 91 is rotated.

The present invention intends to provide a vise which can be linearly and rotational so as to improve the shortcomings mentioned above.

SUMMARY OF THE INVENTION

The present invention relates to a multiple-function clamping device and comprises a rotary base having an annular groove defined in the top thereof. Scale marks are marked along an inclined surface of the rotary base. Two oval notches are defined in two opposite sides of the rotary base. A positioning unit has a first positioning member and a second positioning member, wherein the positioning unit is located in the annular groove of the rotary base so as to form a linear slot between the first and second positioning members. The positioning unit is movable in the annular groove. The first positioning member has a first alignment line which is located corresponding to the scale marks. Multiple linear marks are marked on the top of the first positioning member. A vise has two side slots defined in two sides thereof so as to form an engaging portion between the two side slots. The first and second positioning members are respectively located within the two side slots, and the engaging portion is engaged with the linear slot between the first and second positioning members such that the vise is positioned or movable linearly relative to the rotary base. The vise has a second alignment line which is located corresponding to the linear scale marks of the first positioning member.

Preferably, the annular groove is an inverted T-shaped groove. Two bolts extend through two respective holes in the first and second positioning members and are connected with two sets of nut and washer respectively. Each of the two bolts has an elongate head which is engaged with the annular groove. Each of the elongate heads has a long side and a short side, wherein the length w2 of the short side of the elongate head is larger than the width w3 of the annular groove.

Preferably, each of the first and second positioning members has a protrusion extending from the underside thereof. The two protrusions are engaged with the annular groove. Each of the first and second positioning members has a flange on one side thereof. The two respective flanges are located in the side slots of the vise respectively.

Preferably, the rotary base has a bottom hole defined in the underside thereof. The bottom hole is located corresponding to the annular groove. The bolts are inserted through the bottom hole from the underside of the rotary base and are connected to the annular groove.

The advantages of the present invention are that the rotary base has scale marks and the first positioning member has a first alignment line so that the user is acknowledged the angles that the vise is rotated. Besides, the vise has a second alignment line which provides information of the linear distance that the vise moves.

Each of the elongate heads has a long side and a short side, wherein the distance w2 of the short side of the elongate head is larger than the width w3 of the annular groove, so that the bolts do not loosen and shift, and the vise can be firmly fixed to the rotary base.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
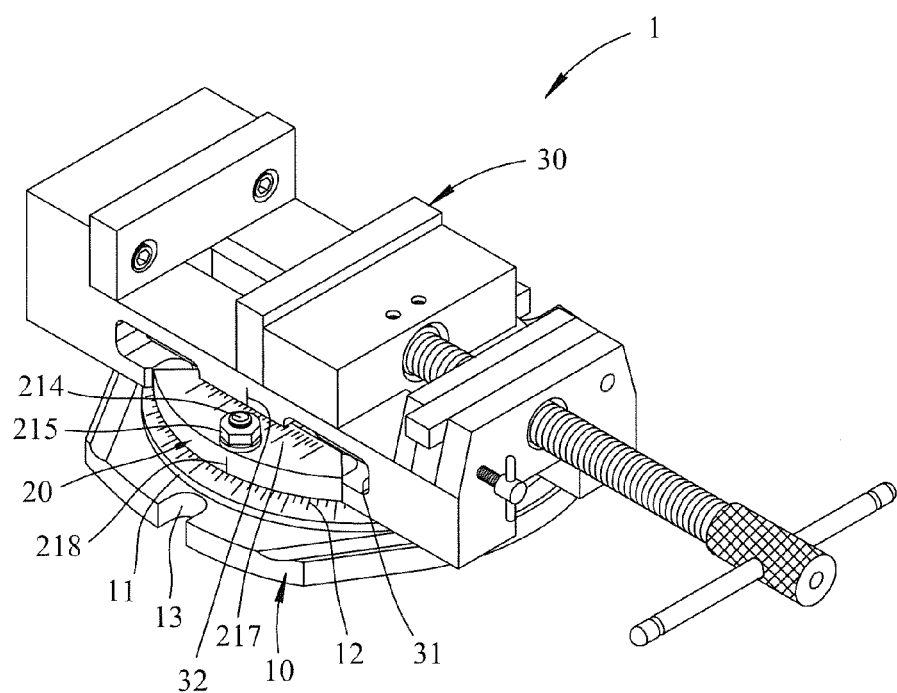
FIG. 1 is a perspective view to show the clamping device of the present invention.
Figure 2:
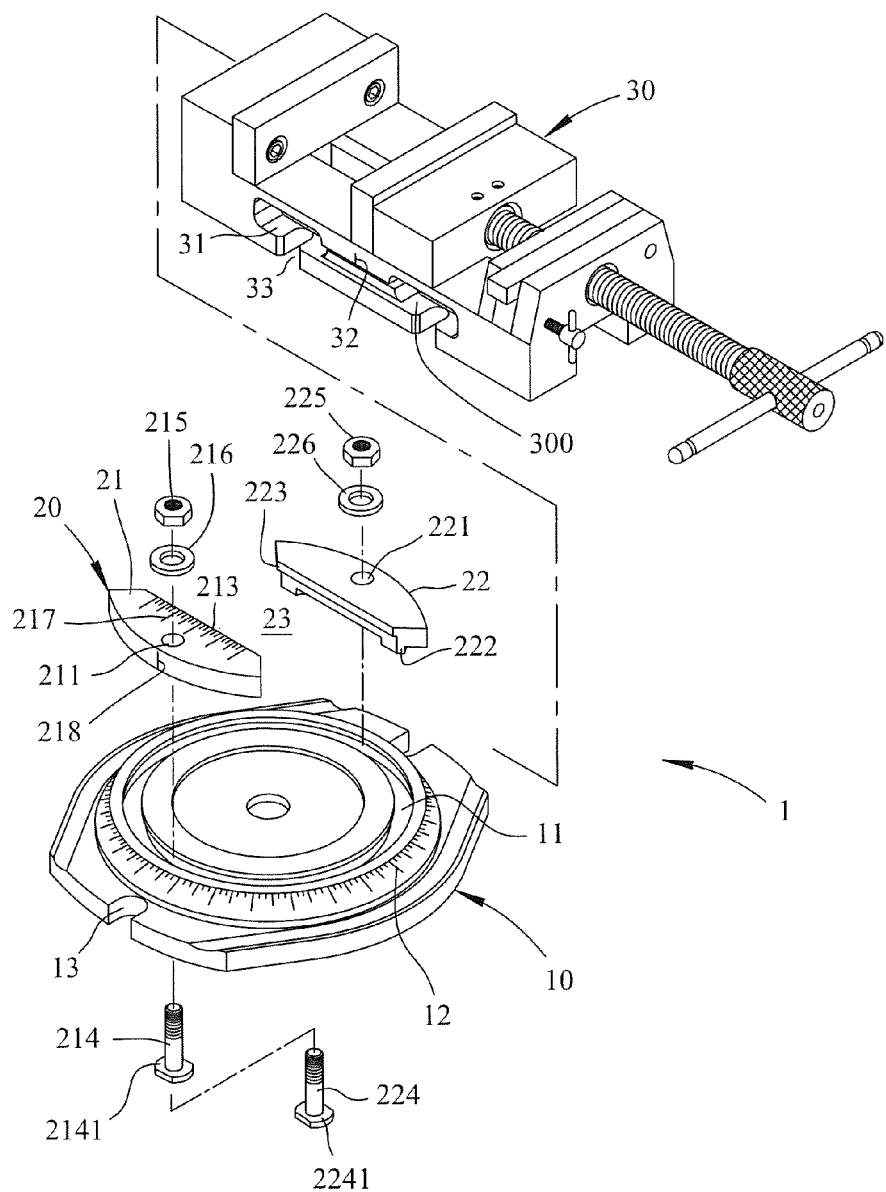
FIG. 2 is an exploded view of the clamping device of the present invention.
Figure 3:
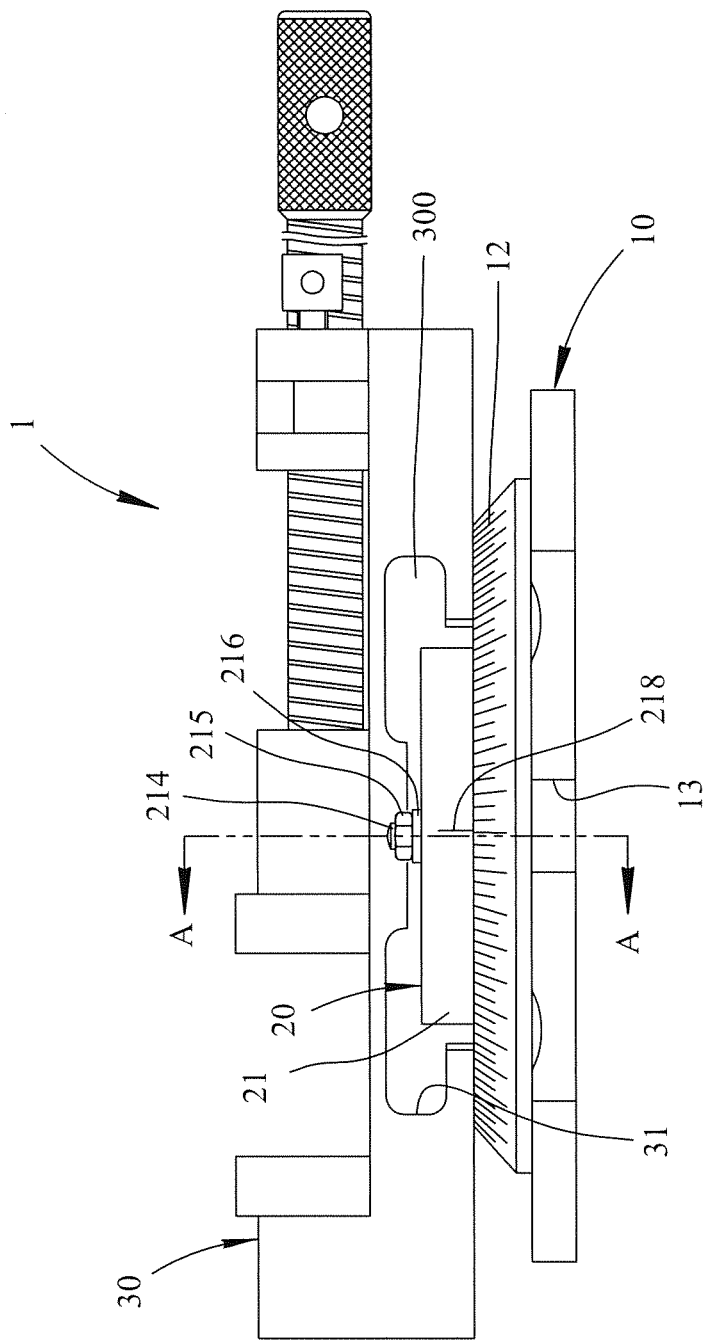
FIG. 3 is a cross sectional view of the clamping device of the present invention.

Referring to FIGS. 1 to 4, the multiple-function clamping device 1 of the present invention comprises a rotary base 10, a positioning unit 20, and a vise 30.

The rotary base 10 is an oval board rotary base 10 which has an annular groove 11 defined in the top thereof. Scale marks 12 are marked along an inclined surface of the rotary base 10. Two oval notches 13 are defined in two opposite sides of the rotary base 10. The annular groove 11 is an inverted T-shaped groove.

The positioning unit 20 comprises a first positioning member 21 and a second positioning member 22. The positioning unit 20 is located in the annular groove 11 of the rotary base 10 so as to form a linear slot 23 between the first and second positioning members 21, 22. The positioning unit 20 is movable in the annular groove 11. The rotary base 10 has a bottom holes hole 14 defined in the underside thereof. The bottom hole 14 is located corresponding to the annular groove 11. The bolts 214, 224 are inserted through the bottom hole 14 from the underside of the rotary base 10 in sequence and are located in the annular groove 11. In detail, the bolt 214 is inserted through the bottom hole 14 and extends through the hole 211, of the first positioning member 21. The first positioning member 21 is then moved along the annular groove 11. The bolt 214 protrudes from the annular groove 11 and is connected with a nut 215 and a washer 216 to position the first positioning member.

The bolt 224 is inserted through the bottom hole 14 and extends through the hole 221 of the second positioning member 22. The bolt 224 protrudes from the annular groove 11 and is connected with a nut 225 and a washer 226 to position the second positioning member. Each of the two bolts 214, 224 has an elongate head 2141/2241 which is engaged with the inverted T-shaped annular groove 11. By providing one bottom hole 14, the bolts 214, 224 are not easily dropped from the bottom hole 14.

The first positioning member 21 has a first alignment line 218 which is located corresponding to the scale marks 12 so that the user knows the angles that the vise 30 is rotated. Multiple linear marks 217 are marked on the top of the first positioning member 21 so that the user knows the angles that the vise 30 moves. Each of the first and second positioning members 21, 22 has a protrusion 212/222 extending from the underside thereof. The two protrusions 212, 222 are engaged with the annular groove 11. Each of the first and second positioning members 21, 22 has a flange 213/223 on one side thereof, the two respective flanges 213, 223 are located in the side slots 31 of the vise 30 respectively.

The vise 30 has two side slots 31 defined in two long sides thereof so as to form an engaging portion 300 between the two side slots 31. The first and second positioning members 21, 22 are respectively located within the two side slots 31, and the engaging portion 300 is engaged with the linear slot 23 between the first and second positioning members so that the vise 30 is positioned or movable linearly relative to the rotary base 10. The vise 30 has a second alignment line 32 which is located corresponding to the linear scale marks 217 of the first positioning member 21. The vise 30 has multiple oval notches 33 defined in two sides thereof and the oval notches 33 communicate with the two side slots 31. By using the oval notches 33, the vise 30 can be used individually to be connected with other work bench of a machine center.

Figure 4:
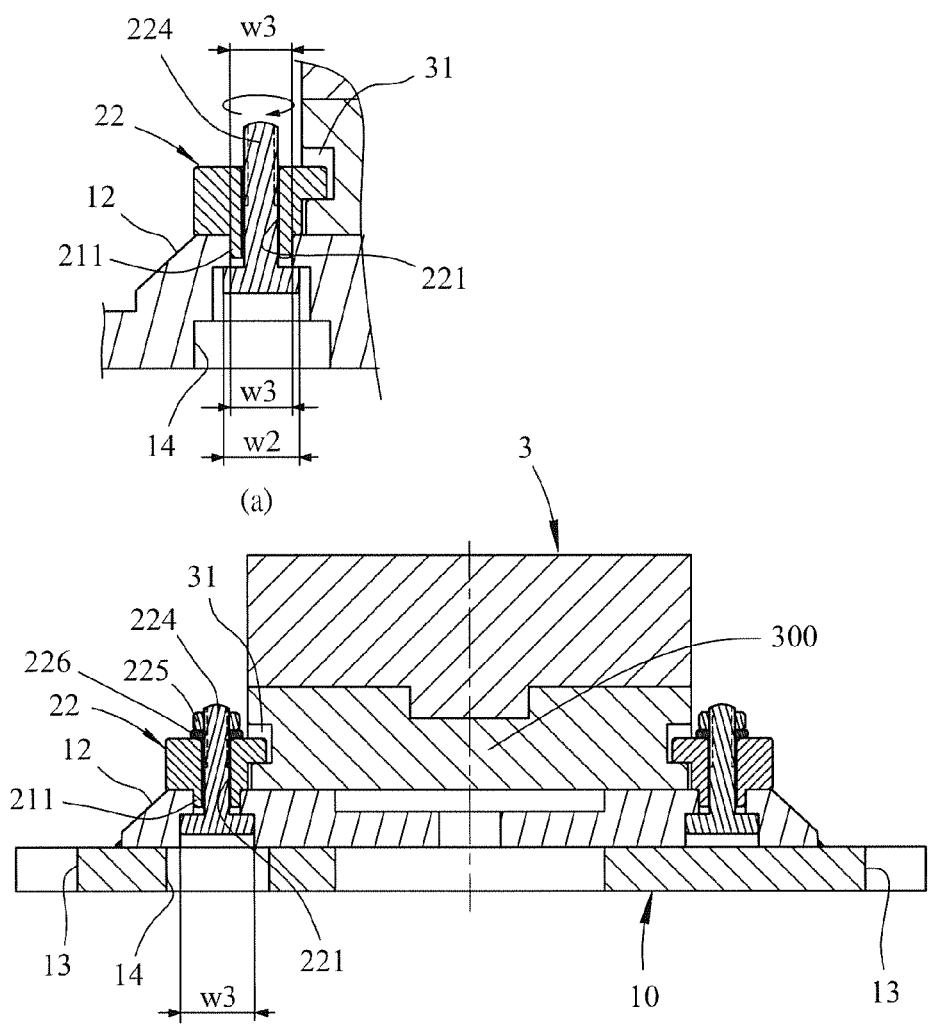
FIG. 4 is a cross sectional view, taken along line A-A in FIG. 3.
Figure 5:
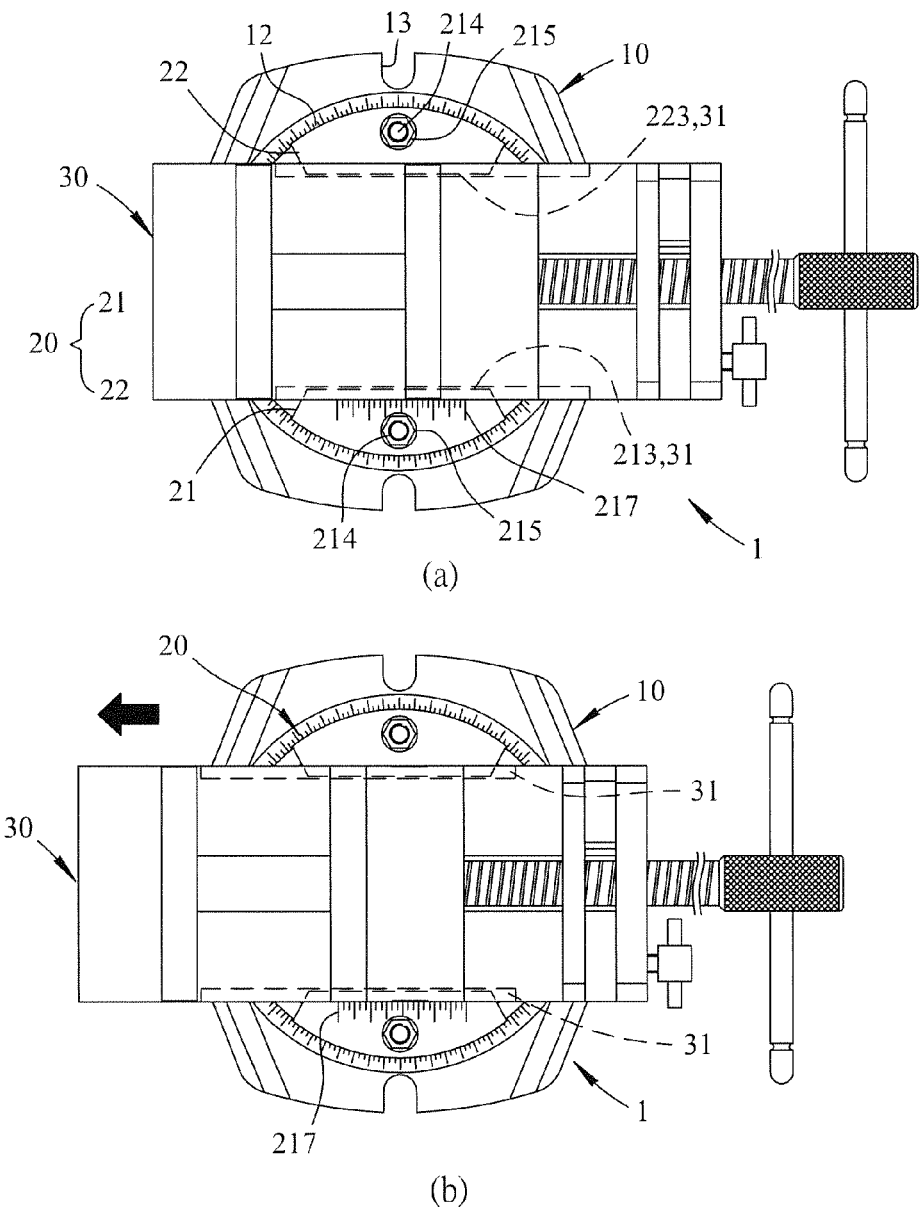
FIG. 5 shows that the vise of the clamping device moves linearly.
Figure 6:
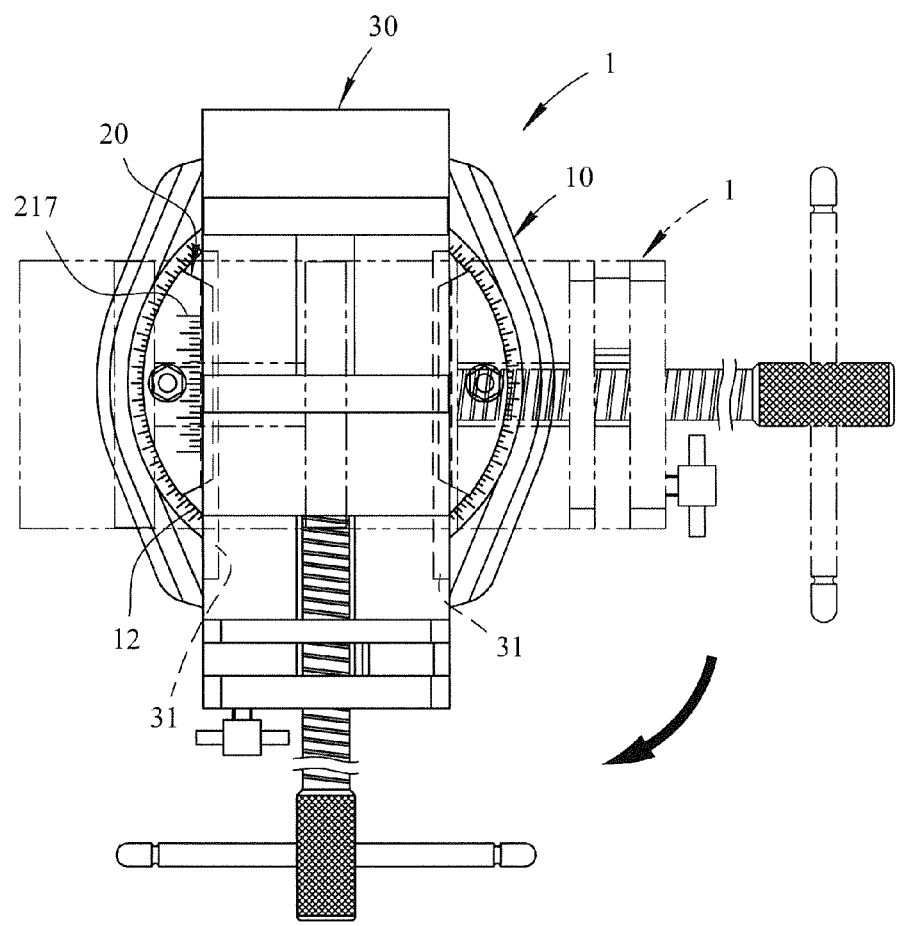
FIG. 6 shows that the vise of the clamping device rotates an angle.
Figure 7:
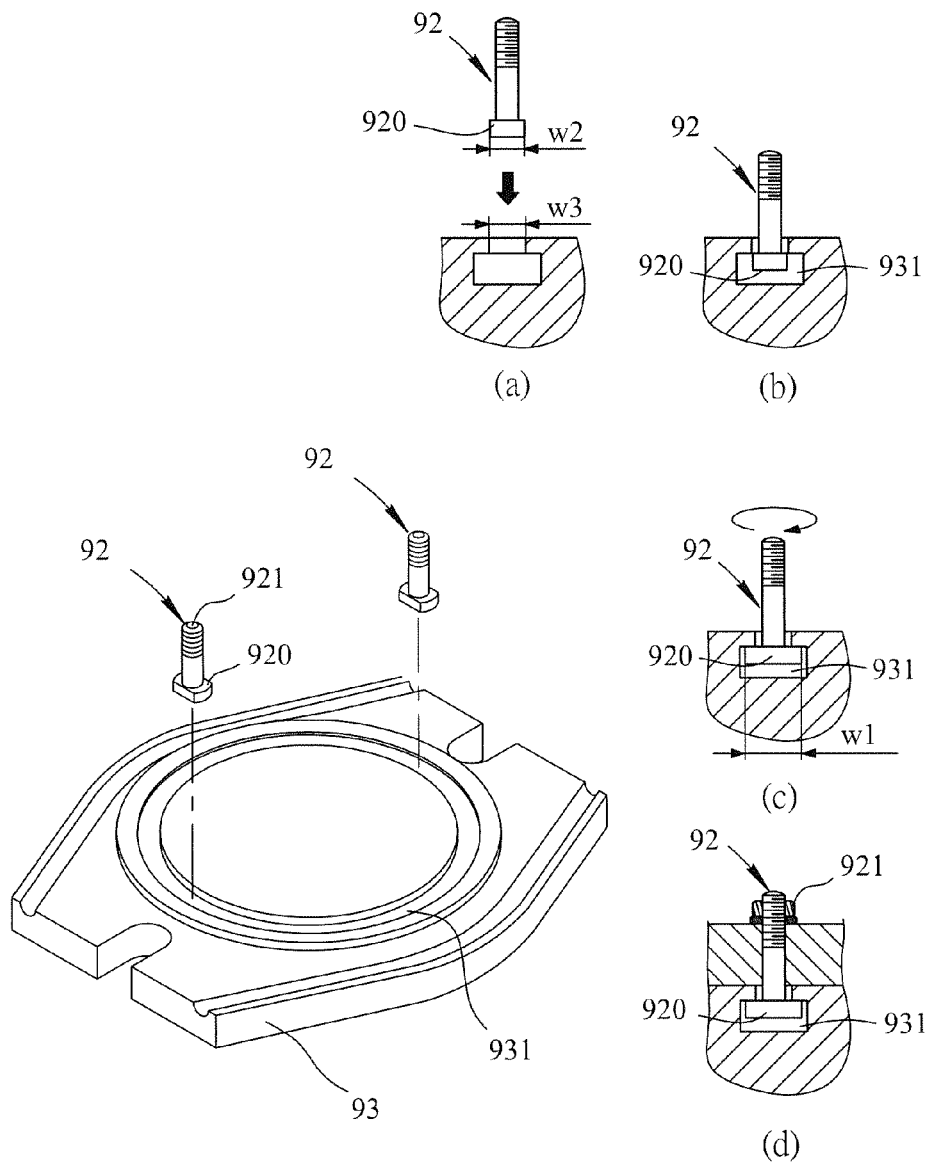
FIG. 7 shows the conventional vise.

As shown in FIG. 4, each of the elongate heads 2141, 2241 has a long side and a short side. The length w2 of the short side of the elongate head 2141/2241 is larger than the width w3 of the annular groove 11. After the bolts 214,224 are inserted through the bottom hole 14 and positioned within the annular groove 11, the bolts 214, 224 extend through the holes 211, 221 of the first and second positioning members 21, 22, and are connected with two sets of nut 215/225 and washer 216/226. The elongate heads 2141, 2241 of the two bolts 214, 224 are accommodated in the inverted T-shaped annular groove 11. The vise 30 can be moved linearly in the linear slot 23 between the first and second positioning members 21, 22, or is fixed to the first and second positioning members 21, 22. When releasing the nuts 215, 225, the vise 30 and the positioning unit 20 can be rotated as shown in FIGS. 5 and 6. Because the length w2 of the short side of the elongate head 2141/2241 is larger than the width w3 of the annular groove 11, the bolts 214 do not escape from the annular groove 11.

As shown in FIGS. 5 and 6, the rotary base 10 has scale marks 12 and the first positioning member 21 has a first alignment line 218 so that the user is acknowledged the angles that the vise 30 is rotated. Besides, the vise 30 has a second alignment line 32 which provides information of the linear distance that the vise 30 moves.

While we have shown and described the embodiment in accordance with the present invention, it should be clear to those skilled in the art that further embodiments may be made without departing from the scope of the present invention.

What is claimed is:

1. A multiple-function clamping device comprising:
   a rotary base having an annular groove defined in a top thereof, scale marks being marked along an inclined surface of the rotary base, two oval notches defined in two opposite sides of the rotary base;
   a positioning unit having a first positioning member and a second positioning member, the positioning unit located in the annular groove of the rotary base so as to form a linear slot between the first and second positioning members, the positioning unit movable in the annular groove, the first positioning member having a first alignment line which is located corresponding to the scale marks, multiple linear marks marked on a top of the first positioning member, and
   a vise having two side slots defined in two sides thereof so as to form an engaging portion between the two side slots, the first and second positioning members respectively located within the two side slots, the engaging portion engaged with the linear slot between the first and second positioning members so that the vise is positioned or movable linearly relative to the rotary base, the vise having a second alignment line which is located corresponding to the linear scale marks of the first positioning member.

2. The clamping device as claimed in claim 1, wherein the annular groove is an inverted T-shaped groove, two bolts extend through two respective holes in the first and second positioning members and are connected with two sets of nut and washer, each of the two bolts has an elongate head which is engaged with the annular groove, each of the elongate heads has a long side and a short side, a length of the short side of the elongate head is larger than a width of the annular groove.

3. The clamping device as claimed in claim 2, wherein the rotary base has a bottom hole defined in an underside thereof, the bottom hole is located corresponding to the annular groove, the bolts are inserted through the bottom hole from the underside of the rotary base and are respectively located in the annular groove.

4. The clamping device as claimed in claim 1, wherein each of the first and second positioning members has a protrusion extending from an underside thereof, the two protrusions are engaged with the annular groove, each of the first and second positioning members has a flange on one side thereof, the two respective flanges are located in the side slots of the vise respectively.

5. The clamping device as claimed in claim 1, wherein the vise has multiple oval notches defined in two sides thereof and the oval notches communicate with the two side slots.

* * * * *